United States Patent [19]

Audouin et al.

[11] Patent Number: 5,327,423
[45] Date of Patent: Jul. 5, 1994

[54] METHOD AND A NETWORK FOR TRANSMITTING MESSAGES IN FREQUENCY CHANNELS

[75] Inventors: Olivier Audouin, Savigny sur Orge; Jean-Michel Gabriagues, le Val Saint-Germain; Michel Sotom, Villebon sur Yvette, all of France

[73] Assignee: Alcatel N.V., Amsterdam, Netherlands

[21] Appl. No.: 825,156

[22] Filed: Jan. 24, 1992

[30] Foreign Application Priority Data

Jan. 24, 1991 [FR] France .................. 91 00793

[51] Int. Cl.$^5$ ........................................ H04J 14/02
[52] U.S. Cl. ................................. 370/76; 370/124; 359/121; 385/24
[58] Field of Search ............... 370/30, 69.1, 70, 76, 370/120, 124, 50; 359/114, 121, 123, 124, 127; 385/24

[56] References Cited

U.S. PATENT DOCUMENTS 5,191,626 3/1993 Stern .......................... 385/24

OTHER PUBLICATIONS

I. M. I. Habbab, "Protocols for Very High-Speed Optical ... ", IEEE Journal of Lightwave Tech, vol. LT-5, No. 12, Dec. 1987, pp. 1782-1794.
R. M. Bulley, et al., "Experimental Demonstration ... ", Technical Digest, European Conf on Optical Comm, vol. 1, Sep. 1987, pp. 345-348.
C. A. Brackett, "Dense Wavelength Division ... ", IEEE Journal on Selected Areas in Comm., vol. 8, No. 6, Aug. 1990, pp. 948-964.

Primary Examiner—Douglas W. Olms
Assistant Examiner—Melvin Marcelo
Attorney, Agent, or Firm—Robbins, Berliner & Carson

[57] ABSTRACT

According to the invention, messages to be transmitted between user terminals interconnected by a transmission network are classified into "heavyweight" messages and "lightweight" messages. The heavyweight messages, i.e. messages containing a large quantity of data, are transmitted over the network in message frequency channels attributed to respective heavyweight messages, while the lightweight messages are transmitted over a shared channel common to the lightweight messages.

4 Claims, 7 Drawing Sheets

METHOD AND A NETWORK FOR TRANSMITTING MESSAGES IN FREQUENCY CHANNELS

The present invention relates in particular to implementing a communications network.

BACKGROUND OF THE INVENTION

A network of the invention may include certain items that are common, as to their functions mentioned below, with a known network. These items include:

a plurality of terminals which are associated with as many respective user peripherals between which messages are to be transmitted;

two transmission lines associated with each of the terminals for transmitting waves, said transmission lines comprising an emission line for guiding emission waves emitted at an emission frequency of the terminal and a reception line for guiding waves received by the terminal; and a star coupler for receiving waves which reach it via the emission line and for transmitting each of said waves to all of the terminals via the reception lines.

In such a network the emission frequencies of the various terminals vary over time. However, to avoid cross-talk, they must remain different and separated from one another by spectrum distances that are not less than a frequency increment. The frequency increment is selected to reserve a message channel of sufficient bandwidth within the spectrum range of the network. These frequencies thus constitute a sequence starting from a base frequency, which sequence is referred to below as a "stack" and it extends up to a stack top. This sequence corresponds to the sequence of message channels including said frequencies and also to the sequence of terminals that use said frequencies. In each of these sequences, an item may be adjacent to another item, i.e. it may precede it or follow it. The top of the stack is constituted by one of the emission frequencies, or for a call made over a plurality of frequencies by a group of such frequencies allocated to the same call, and mutually adjacent, for example, said frequency or said group being the furthest from the base frequency.

When a terminal is to transmit a message, it emits calling signalling including the address of a terminal that is to be called. If said terminal is ready to set up a call, it responds by emitting an acknowledge signal.

Said calling and acknowledge signalling and other signalling required to operate network is transmitted in the form of modulation on a carrier wave whose own frequency constitutes a signalling frequency. The frequencies of the modulated wave lie in a signalling channel which is reserved for said frequencies to one side of the message channels in the spectrum range of the network. The signalling channel is shared between all of the terminals that are not tuned to message channels in the sense that it may be used by all of said terminals.

A first known network is described in a first prior document constituted by European patent document EP-A-0 381 102 (F° 16761). That document does not describe the existence of a signalling channel nor does it describe how to use one.

A second known network is described in a second prior document: "Protocols for very high-speed optical fiber local area networks using a passive star topology" (Isam M. I. Habbab, Mohsen Kavelhrad, and Carl-Erik W. Sundberg, Journal of Lightwave Technology, Vol. LT-5, No. 12, December 1987, pp. 1782-1793).

The spectrum range of said second known network includes a plurality of message channels and a signalling channel whose positions appear to be predetermined. The signalling channel is reserved for transmitting signalling of the kind mentioned above.

The spectrum range of a network of this type may be large if the mean number of messages to be transmitted per unit time said frequency increment and are themselves large. The increment is chosen to be large enough to enable messages having the highest data rate to be transmitted.

A particular object of the present invention is to improve in a simple manner the effectiveness with which the spectrum range of such a network is utilized.

SUMMARY OF THE INVENTION

In particular, the present invention provides a method of transmitting messages in frequency channels, the method being applied to the case where a plurality of messages are to be transmitted simultaneously between user peripherals via a transmission network including terminals connected to respective user peripherals, the method comprising the following operations:

said messages are transmitted over transmission lines interconnecting said terminals and that are common, at least in part, the messages being transmitted in different frequency channels constituting message channels respectively allocated to the messages, the terminals between which each of these messages is transmitted being tuned for that purpose to the message channel allocated to the message throughout the duration of the message; and other information is transmitted between the terminals over said lines that are common at least in part in another frequency channel that constitutes a shared channel, the terminals that are not tuned to a message channel being tuned for this purpose to the shared channel;

wherein said messages to be transmitted are classified as heavyweight messages and as lightweight messages, a heavyweight message requiring a relatively high data rate for transmission during a relatively long call duration, while a lightweight message is capable of being transmitted at a relatively low data rate and/or during a relatively short call duration; and the heavyweight messages are transmitted in respective message channels and the lightweight messages are transmitted in said shared channel.

In addition to said lightweight messages which are to be transmitted between user peripherals, the data transmitted in the shared channel then preferably includes signalling which is to be transmitted between the terminals of the network but which is not to be transmitted between the user peripherals using the network. Said calling and acknowledge signalling constitute examples of such signalling. The shared channel then constitutes the above-mentioned signalling channel.

The present invention also provides a message transmission network comprising the above-mentioned common items and using frequency channels which constitute message channels respectively allocated to messages being transmitted between terminals and a shared channel shared between the other terminals;

wherein a terminal under consideration which may be any of said terminals comprises:

means for classifying messages to indicate whether a message to be transmitted is a heavyweight message or a lightweight message;

heavyweight message transmission means for transmitting said heavyweight messages in said message channels; and lightweight message transmission means for transmitting said lightweight messages in said shared channel.

In an advantageous disposition, the terminal under consideration includes an emitter for constituting common message transmission means, said emitter being frequency controlled in particular by said message classifying means so as sometimes to constitute said heavyweight message transmission means and sometimes said lightweight message transmission means.

BRIEF DESCRIPTION OF THE DRAWINGS

Embodiments of the invention are described by way of example with reference to the accompanying drawings, in which.

DETAILED DESCRIPTION

Figure 1:
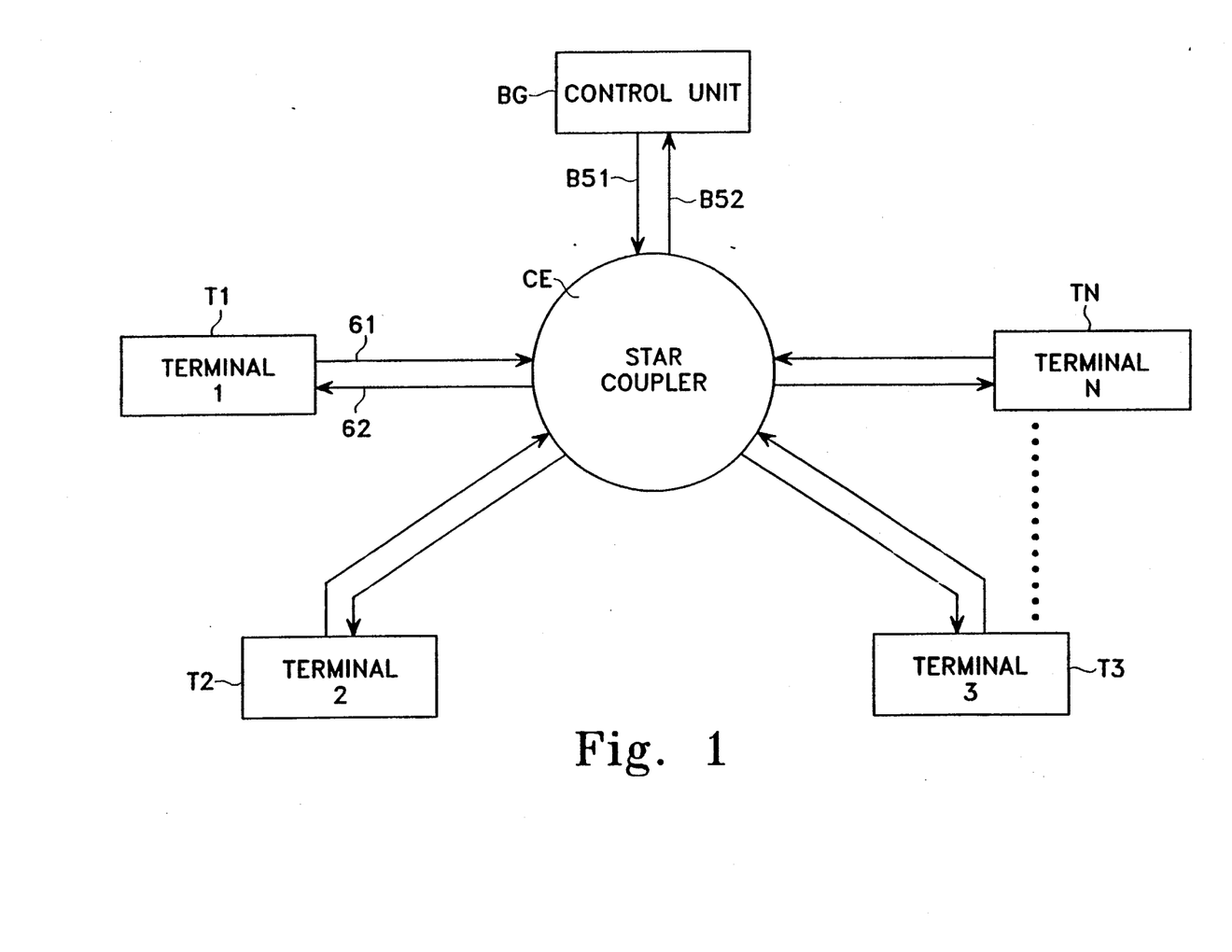
FIG. 1 is an overall view common, in particular, both to a first data network and to a second data network given as examples of implementations of the present invention.

With reference to FIG. 1, the present description begins by recalling the general structure common to networks of this kind. Such a network comprises the following items:

a plurality of terminals (T1, T2, T3, . . . , TN) associated with respective user peripherals between which messages are to be transmitted;

two optical fibers associated with each of said terminals (T1) for guiding optical waves, said fibers comprising an emission fiber (61) for guiding emission waves emitted at an emission frequency of the terminal and a reception fiber (62) for guiding waves that are to be received by the terminal; and a star coupler (CE) for receiving the optical waves that reach it via said emission fibers, and for transmitting each of said optical waves to all of said terminals via said reception fibers.

Figure 3:
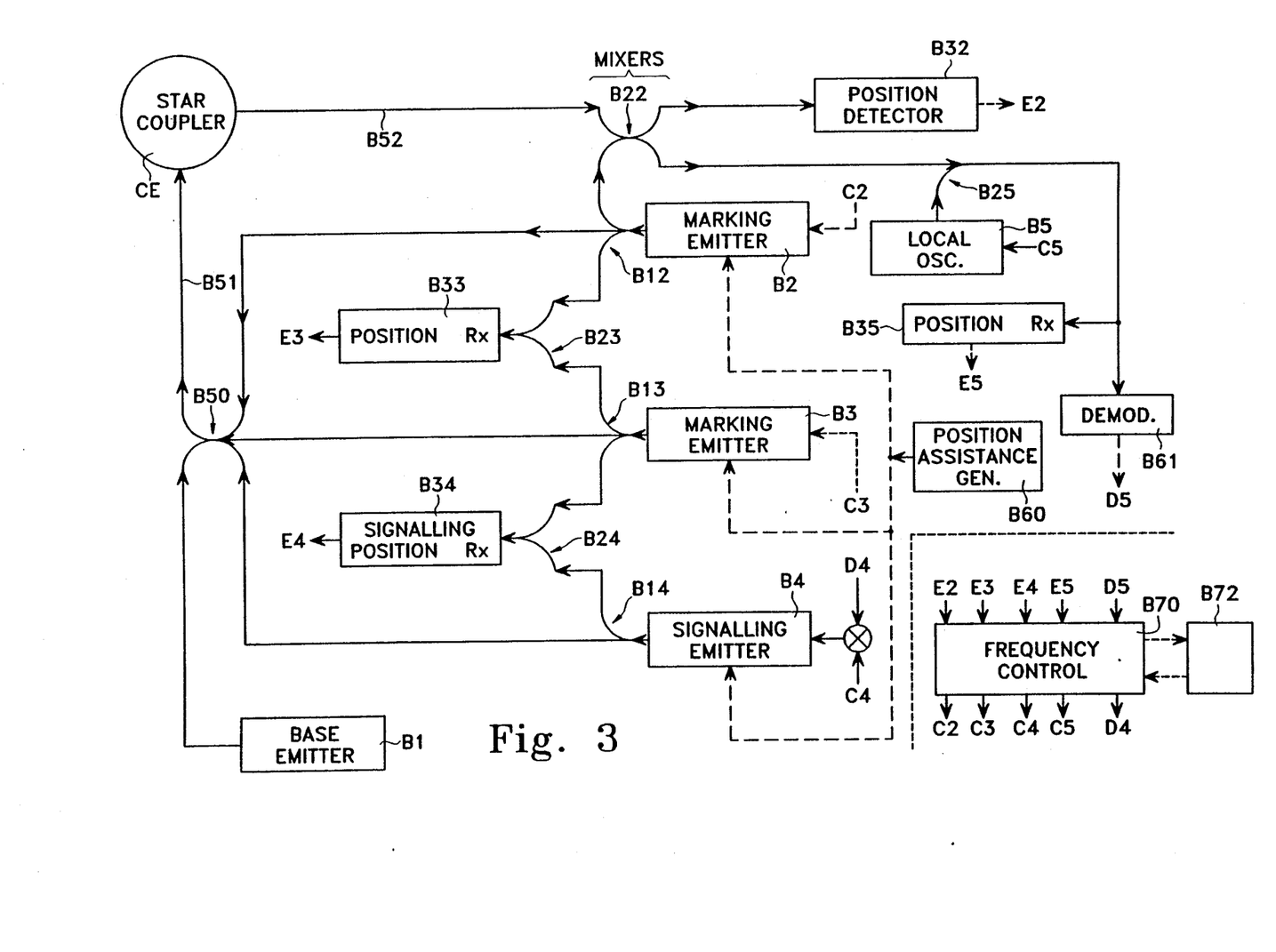
FIG. 3 is a block diagram of a control unit belonging to said network.

A control unit BG includes a base generator (B1) which is shown in FIG. 3 and which emits an optical base wave at a base frequency (FO) to constitute a frequency reference for controlling said emission frequencies.

In such a network, each of the terminals is sometimes free and sometimes busy. When it is busy, it may be precalling and/or precalled and then it may be calling or called.

A terminal is calling and emitting while it is transmitting a message to a called terminal in the form of information-carrying modulation on an optical carrier wave which constitutes an emission wave from said terminal and which is emitted for a call duration. It is assumed below that the frequency specific to said carrier wave constitutes simultaneously an emission frequency and spectrum position of said terminal, and a transmission frequency for said message. It can be varied on command over a spectrum range of the network. Its position within said range may be defined on the basis of the base frequency. Below, when it is said that said transmission frequency is, at a given instant, more or less close or more or less distant or that in the course in time it moves closer or it moves away, the description relates to the closeness or the distance of said transmission frequency relative to said base frequency. To simplify some of the explanation, the case where the base frequency is lower than the emission frequencies is sometimes considered more particularly, and words such as "higher" and "lower" applied to frequencies relate to such circumstances. The frequencies of the modulated emission wave lie in a message channel which is reserved within the frequency range of the network for transmitting a message, and which for said purpose has a message spectrum width. This wave is received by the called terminal and constitutes for said terminal a reception wave whose frequency constitutes a reception frequency. The terminal is the receiving. The calling and the called terminals are in pairs forming respective pairs of terminals in communication with each other.

Communication may be one-way. A single message is then transmitted. It is transmitted from the calling terminal to the called terminal. Communication may also be two-way. Under such circumstances, it may be performed in so-called "alternating" mode. The calling terminal and the called terminal then take up the same position in the spectrum and the same message channel is occupied by go messages and by return messages which follow one another in time. Two-way communication may also be performed in so-called "duplex" mode. Under such circumstances, the above-mentioned message then constitutes a go message occupying a go message channel. The called terminal is suitable for responding to said message by emitting a return message during the same call period. The return message is transmitted to the calling terminal on an optical carrier wave which occupies a return message channel and which constitutes an emission wave for the called terminal and a reception wave for the calling terminal. A call is then constituted by the go and receive message channels taken together.

A free terminal becomes a pre-calling terminal when, in response to an instruction from the user peripheral associated therewith, it prepares or emits a calling signal including the address of a precalled terminal for the purpose of then setting up a call during which said precalling terminal and said precalled terminal become a calling terminal and a called terminal respectively.

There follows a description in general terms of the various dispositions which have been found to be advantageous, in particular in the context of the present invention, for implementing networks of this kind. These dispositions are adopted in the two networks given by way of example and they will be better understood during the subsequent description of these networks in more concrete terms.

The terminals of the networks are similar to one another. That is why only one of them is considered when describing their internal structure. In a disposition that is common to the first previously-mentioned known network and to the two networks given as examples of the present invention, the terminal under consideration includes the following items:

an emitter (1) controllable at least in frequency to emit said emission wave and to apply information-carrying modulation to said wave;

emission positioning means for positioning the emission frequency of said emitter in a spectrum range of the network, by forming a stack of emission frequencies which are variable and which follow one another starting from a fixed base frequency and going to the top of the stack, and being separated from one another by spectrum distances that are not less than a predetermined frequency increment;

reception means for demodulating some of the waves received by the terminal under consideration; and a control circuit (40) for controlling the emitter, the emission positioning means, and the reception means.

The emission positioning means of the terminals are such that their emission frequencies form a sequence of frequencies at intervals with bottom limits in which each next frequency is separated from a preceding frequency by an inter-terminal distance that cannot drop significantly below a predetermined frequency increment (DF) that is greater than said message spectrum width. That is why the positioning means of the terminal in question include emission support means themselves including the following items:

an emission positioning mixer (31) for mixing the waves received by the terminal in question with a local emission positioning wave having a local emission positioning frequency (F(2P−1)A) in the optical range and which is applied to a local input (31A) of the mixer by the emitter (1) of the terminal to represent its emission frequency (F(2P−1));

an emission positioning detector (10) fed by said emission positioning mixer to form electrical beat signals each resulting from the mixing of said local emission positioning wave with one of said received waves which corresponds to said signal, at least one of said signals constituting an emission positioning beat signal (F(2P−2)BE) if that one of said received waves which corresponds thereto constitutes an external emission positioning wave (F(2P−1)B) defining a support frequency (F(2P−2)) of the terminal under consideration, the frequency of said signal constituting an emission positioning beat frequency (F(2P−1)A−F(F(2P−2)B) which defines a support distance (F(2P−1)−F(F(2P−2)) between said emission frequency (F(2P−1)) and said support frequency (F(2P−2)), one of said received waves constituting said external positioning wave only if said support distance is situated in a predetermined support internal including said frequency increment (DF);

an emission position discriminator (11) for receiving said emission position beat signal and for responding thereto by providing an emission position signal representative of an emission position difference equal to the difference between said emission positioning beat frequency (F(2P−1)A−F(F(2P−2)B) and a reference emission positioning frequency (DF−2FS) such that eliminating said difference means that the difference between said emission frequency (F(2P−1)) and said support frequency (F(2P−2)) of the terminal under consideration is equal to said frequency increment (DF); and emission position control means (40) which control said emission frequency of said terminal in response to said emission position difference signal to make said emission positioning beat signal equal to said emission positioning reference frequency.

If the terminal under consideration is at spectrum distances more or less equal to the increment DF both as a preceding terminal and as a following terminal, then the detector 10 delivers two emission positioning beat signals.

That is why, in an advantageous disposition, the emission position discriminator (11) includes an emission positioning filter for selecting and superposing two of said emission positioning beat signals, said filter being set to a frequency equal to said emission positioning reference frequency and having a narrow passband centered on said frequency, said emission position signal being representative of the power of the output signal from said filter, and said emission position control means (40) controlling said emission frequency (F(2P−1)) of said terminal to deliver said maximum amplitude.

The reception means may be of the heterodyne type and may include the following items:

a local oscillator (2) for providing a local reception wave which is optical and whose frequency is controllable, constituting a local reception frequency (L(2P−1)) of the terminal under consideration;

a heterodyning mixer (32) receiving firstly said waves received by the terminal under consideration, such a wave constituting one of said reception waves and having one of said reception frequencies (F(2P)) for the terminal under consideration when the message carried by said wave is to be transmitted to said terminal, said mixer receiving secondly said local reception wave and mixing said wave with said received waves;

a heterodyning detector (20) fed by said heterodyning mixer to provide electrical beat signals, one of which is a reception beat signal (K(2P)H) having a reception beat frequency which is the difference between said reception frequency and said local reception frequency and which is close to a predetermined intermediate frequency (FI);

a demodulation filter (22) for receiving said reception beat signal, for demodulating it, and for providing a demodulated signal representative of said information to be transmitted to the terminal under consideration and carried by said reception wave;

a frequency discriminator constituting a reception position discriminator (21) for receiving said reception beat signal and for responding thereto by providing a reception position error signal representative of the difference between said reception beat frequency and said intermediate frequency (FI); and reception position control means (40) which controls said local reception frequency in response to said reception position error signal to make said reception beat frequency equal to said intermediate frequency.

The control circuit of the terminal under consideration is connected to the user peripheral associated with said terminal to receive therefrom a message to be transmitted. It includes modulation means which control the emitter of said terminal accordingly to provide said information-conveying modulation of the emission wave when the terminal under consideration is emitting. It includes said emission position control means. It receives said demodulated signal and includes address-recognition means for recognizing the address of the terminal under consideration. It switches the terminal to receive mode when said address has been recognized and it subsequently transmits the received message to the associated user peripheral. It receives said reception beat signal and it includes said means for controlling reception position.

In addition, the terminal under consideration is suitable for emitting and receiving signalling in the form of modulation which affects optical carrier waves that are guided by said emission and reception fibers of said terminal and which are transmitted via said star coupler. Such signalling includes a calling signal which is emitted by the terminal when it is precalling and which includes the address of the precalled terminal.

In an advantageous "stack compression" disposition, the control circuit of the terminal under consideration is permanently ready, i.e. at all instants throughout the duration of a call, to vary the emission frequency of the terminal.

Such variation is performed if a support frequency lower than the terminal (as defined below) moves towards the base frequency. Under such circumstances, the emission frequency of the terminal under consideration accompanies the displacement of said support frequency. Such a variation is also performed if such a lower support frequency that was previously in use disappears. Under such circumstances, the emission frequency moves progressively towards the base frequency until a new lower support frequency can be defined. The new lower support frequency may be the emission frequency of a preceding terminal if such a terminal exists, or it may be the base frequency itself.

The emission positioning means of the terminal under consideration enable it to perform these functions by means of the above-mentioned items except that the emission position control means include stack compression means for this purpose which may be incorporated in the control circuit of the terminal and which are as follows:

initial emission positioning means which are put into action when the terminal under consideration becomes free or at least before the beginning of a new call, these means bring the current emission frequency of the terminal under consideration to the top of the stack of the emission frequencies of the various terminals; for example they may move said frequency progressively away from the previously used emission frequency until they detect that said emission frequency has indeed reached the top of the stack;

lower support detection means for detecting the possible presence amongst the waves received by the terminal under consideration of an external lower emission positioning wave constituted by one of said external emission positioning waves defining a lower support frequency for the terminal; such a frequency is called a "support" frequency for the terminal providing said support frequency is closer to the base frequency than is the emission frequency of the terminal; said means provide a loss-of-lower-support signal when such an external lower emission positioning wave no longer exists;

means for servo-controlling the emission position during a call which are kept in action during the call so long as there exists one such lower support frequency for the terminal under consideration; said means are called "emission support means" and they control the emission frequency of said terminal in the manner indicated above to eliminate said difference in emission position; and emission shift means which are put into action during a call when one of said loss-of-lower-support signals is provided for the terminal under consideration; these means move the emission frequency of the terminal progressively towards the base frequency until said loss-of-lower-support signal is no longer provided.

This moving together of frequencies is performed at a shift speed which is preferably chosen to be large. However this speed must be small enough to enable the emission position servo-control means of a following terminal to follow the variation in said frequency. This is necessary because said frequency constitutes the lower support frequency for the following terminal.

A stack of emission frequencies is thus achieved for the various terminals building up from the base frequency. These frequencies follow one another at intervals, many of which are normal intervals equal to said frequency increment. A larger frequency interval appears when a terminal stops transmitting a message. Under such circumstances, the following terminal can no longer define a lower support frequency. It therefore progressively and regularly shifts its emission frequency towards the base frequency during a shift period which constitutes a fraction of said call period and which comes to an end either when a new lower support frequency can be defined or else when the call is over. If the frequency shift speed is chosen to be large enough, the shift period is small enough for large frequency gaps increasing the total width of the spectrum range required by the network to be kept to a small amount only.

In another advantageous disposition, said lower support detection means for the terminal under consideration comprise the following items:

non-selective support detection means for supplying a loss-of-support signal when one of said external emission positioning waves for the terminal no longer exists; for this purpose, these means may monitor said emission position signal which is representative of the power of the emission positioning beat signal; a predetermined drop such as a rapid drop of about 50% in said power indicates either that an external lower emission positioning wave has disappeared or else that an external upper emission positioning wave has disappeared; under such circumstances, said means trigger the appearance of the loss of support signal; and support discrimination means which are put into operation at least when said loss-of-support signal is provided and which then provide said loss-of-lower-support signal if the external emission positioning wave that has disappeared is a lower one of said external emission positioning waves.

The two networks given by way of example differ from each other as to the structure of said support discrimination means. The first network operates in duplex mode. As a result, while the terminal under consideration is engaged in a call, it uses two adjacent emission frequencies and the terminal in question is emitting either on the lower frequency or on the upper frequency of the call. It therefore constituents either the lower terminal or the upper terminal of the pair of terminals that are communicating with each other, it being understood that the lower terminal is the terminal that comes before the other terminal in said pair in the sequence of the terminals that corresponds to the stack of emission frequencies. In the first network given by way of example, the lower terminal is the calling terminal, but it will be understood that it could equally well be the called terminal.

In an advantageous disposition, the support discrimination means of the terminal under consideration in a network operating in duplex mode records a relative position bit at the beginning of each call and retains it until the end of the call, said bit representing the fact that the terminal under consideration is calling or called and is consequently the lower terminal or the upper terminal in the pair of terminals concerned by a given call. These means provide a low indication if the terminal is the lower terminal of the pair. The said loss-of-lower-support signal is provided when said loss-of-support signal and said low indication are provided simultaneously. As a result, the pair of terminals under consideration, i.e. the pair including the terminal under consideration during a call under consideration, will offset its two emission frequencies towards the base frequency if the preceding call disappears, while, in contrast, the two emission frequencies of the pair under consideration will remain unchanged if it is the following call that disappears.

It should be understood that in practice the various means included in the control circuit are advantageously implemented in the form of program elements incorporated in said circuit.

In another advantageous disposition, the network includes a marking generator for prior marking at a marking instant one or more spectrum positions which are marked for use during the next call. These marked positions are spectrum positions which are not occupied by any of the terminals in the network at the marking instant and which are to be seized by one or more of the terminals to implement the next call, i.e. the first call to begin on the network after said instant.

Such prior marking has the advantage of reducing the access time of the network.

The structure of the marking generator may be analogous to that of the terminal under consideration except that no information-carrying modulation is required on the optical waves that it emits since the only function of these waves is to define frequencies.

It includes the following items:

an emission fiber (B51) and a reception fiber (B52) for connecting it to said star coupler (CE) like the terminal under consideration;

at least one marking emitter (B2) that is controllable in frequency to emit an optical marking wave (FMI) on said emission fiber; and marking positioning means (B22, B32, B70) controlling the marking emitter to give the marking wave a marking frequency (FM1) having a predetermined relationship with a spectrum position that is to be seized to establish the next call by means of a terminal participating in said call, which position is thus marked by said marking wave.

The predetermined relationship is such that the marking wave facilitates and/or accelerates displacement of the emission frequency which the terminal participating in the call must perform to reach the marked spectrum position.

By way of examples of such predetermined relationships, the marking frequency may coincide with the marked position or it may be situated at a predetermined spectrum distance from said marked position, which distance is related to said frequency increment.

Naturally, when the network includes the above-mentioned stack compression means, the position(s) marked by the marking generator(s) is/are situated at the top of the stack, as described below.

In another advantageous disposition, the network includes a signalling reference generator which itself includes:

a signalling emitter (B4) which is controllable in frequency to emit an optical wave that constitutes a signalling reference wave at a signalling frequency (FZ);

signalling positioning means including signalling position servo-control means and signalling position shift means for positioning said signalling frequency in the spectrum range of the network;

an emission fiber (B51) for guiding said signalling reference wave to said star coupler (CE); and a reception fiber (B52) for guiding optical waves that have been transmitted to the coupler and which are received by said generator.

The signalling position servo-control means are analogous to the control means of the terminal under consideration and include the following items:

a signalling positioning mixer (B24) for receiving firstly said waves received by the signalling reference generator and secondly a local signalling positioning wave that is optical and that defines said signalling frequency;

a signalling positioning receiver (B34) fed by said signalling positioning mixer to form electrical beat signals one of which is a signalling positioning beat signal that results from mixing said local signalling positioning wave with an external signalling positioning wave constituted by one of said received waves defining a signalling support frequency which is the most distant frequency in the stack of said emission frequencies, the frequency of said signal constituting a signalling positioning beat frequency lying in a predetermined range and representative of a spectrum distance between said signalling frequency and said signalling support frequency;

a signalling position discriminator (not shown) for receiving said signalling positioning beat signal and for responding thereto by providing a signalling position signal representative of the difference between said signalling positioning beat frequency and a predetermined frequency; and signalling frequency control means (B70) which control said signalling frequency in response to said signalling position signal to servo-control the spectrum distance between said signalling frequency and said signalling support frequency to a predetermined spectrum distance supplement which constitutes a signalling supplement.

The signalling position shift means move the signalling frequency away when a new call is established, with this being done over a shift distance that is equal to a number of frequency increments equal to the number of emission frequencies that are used by the new call.

The emission positioning means of the terminal under consideration then include, in association with its said control circuit:

signalling search means for moving its emission frequency progressively away from the base frequency when the terminal becomes free, and for recognizing when said emission frequency coincides with said signalling frequency; and standby servo-control means controlled by said signalling search means to servo-control said emission frequency to said signalling frequency from the moment when coincidence between said two frequencies is recognized.

This disposition has the advantage that the access time to the network is reduced by the fact that when the terminal under consideration is free, its spectrum position is at least close to the position that it will occupy during its next call.

The control circuit (40) of the terminal under consideration further includes call signalling means for modulating said emission wave having said signalling frequency with call signalling and for emitting said signalling when a message is to be transmitted by said terminal, the frequencies of the emission wave as modulated in this way occupying a signalling channel (KZ) having a signalling spectrum bandwidth.

The terminal under consideration under includes reception standby initial positioning means (B70) for bringing said local frequency of said terminal to a spectrum position whose distance from said signalling frequency is equal to said intermediate frequency when said terminal is free so as to enable said reception means subsequently to receive messages in the signalling channel (KZ).

The said emission positioning means of the terminal under consideration include emission search means which are put into operation when the terminal is to switch to emission and which move its emission frequency towards said base frequency from said signalling frequency down to a pre-emission position in which one of said lower support frequencies appears for said terminal, and reception search means which are put into operation by said control circuit when said terminal is to switch to reception and which bring said local reception frequency of said terminal to a pre-reception position whose distance from the pre-emission position of one of said terminals is equal to said intermediate frequency.

The pre-emission position used for establishing said pre-reception position of the terminal under consideration is the pre-emission position of the same terminal if the call is being established in alternating mode. If the call is being established in duplex mode, the pre-emission position used is the pre-emission position of the terminal which is paired with the terminal under consideration.

In another advantageous disposition, the signalling reference generator is included in the control unit BG. The control unit also includes reception means similar to said reception means in the terminal under consideration and a control circuit which is analogous to said control circuit of the terminal under consideration except that firstly it does not provide communication with an associated user peripheral and secondly it is required to receive, to process, and to emit signalling over the signalling channel for the purpose of controlling the network.

In another advantageous disposition, the signalling reference generator constitutes one of said marking generators and for this purpose it further includes:

at least one first marking emitter (B2) of controllable frequency for emitting a first marking wave on said emission fiber of said generator; and first marking positioning means for giving said wave a first marking frequency (FM1).

Said first marking positioning means are analogous to the emission positioning means and include the following items:

a first marking positioning mixer (B22) for receiving firstly said waves received by the signalling reference generator and secondly a local first marking positioning wave that is optical and that defines the first marking frequency;

a first marking positioning detector (B32) fed by the first marking positioning mixer to form beat signals that are electrical, one of which is a first marking positioning beat signal resulting from mixing said local first marking positioning wave with one of said received waves that defines said signalling support frequency (F2P), the frequency of said signal constituting a first marking positioning beat frequency lying in a predetermined interval and representative of an interval between said first marking frequency and said signalling support frequency; and a first marking positioning discriminator (not shown) for receiving said first marking positioning beat signal and for responding thereto by providing a first marking position signal representative of the difference between said first marking position beat frequency and a predetermined frequency.

The control circuit (B70) of the signalling reference generator generates the first marking frequency in response to the first marking position error signal to servo-control the spectrum distance between said first marking frequency and the signalling support frequency (F2P) to said frequency increment (DF).

When the terminal under consideration is to switch to reception while in communication with another terminal which is positioned on said first marking frequency, the first marking wave enables the terminal under consideration to servo-control its local reception frequency relative to said first marking frequency without needing to wait for an emission from said other terminal for this purpose. If the marking frequency is unique, said signalling supplement is advantageously equal to twice said frequency increment.

When operating in duplex mode where two adjacent message channels are used for each call and where the terminal under consideration is the upper terminal, i.e. is to occupy the upper channel, i.e. the channel whose carrier frequency is further from the base frequency, said first marking frequency also constitutes said lower support frequency for said terminal.

Under such circumstances, a second marking frequency (FM2) follows the first at a distance equal to said frequency increment. A corresponding second marking wave is emitted by a second marking emitter (B3) provided with spectrum positioning means analogous to the above means. It enables the signalling frequency and the local reception frequency of the upper terminal to be positioned.

The signalling supplement is then advantageously equal to three times said frequency increment.

In another advantageous disposition the means for servo-controlling the emission position of the terminal under consideration further include spectrum positioning assistance means themselves including:

a positioning assistance generator (53) for providing a positioning assistance signal at a predetermined positioning assistance frequency (FS); and positioning assistance modulation means (1) for modulating at least a fraction of the emission wave from the terminal under consideration by said positioning assistance signal so as to generate two positioning assistance side waves at two positioning assistance side frequencies whose spectrum distances from the emission frequency (F(2P−1)) of said terminal are equal to said positioning assistance frequency (FS). A first side wave has a first positioning assistance side frequency (F(2P−1)A) closer to said lower support frequency (F(2P−2)) of said terminal than its emission frequency. It constitutes said local emission positioning wave transmitted to said emission positioning mixer of the terminal under consideration.

The second positioning assistance side wave formed in this way constitutes said external emission positioning wave for the terminal following the terminal under consideration.

The positioning assistance frequency (FS) preferably lies between one-fourth and one-half of said frequency increment (DF).

These positioning assistance means present the advantage that the emission positioning beat frequency may be much less than the support distance. It may be situated, for example, in the microwave range whereas the support distance is substantially equal to the frequency increment which is situated in the optical frequency range. The emission positioning beat signal can thus be processed by means of wellknown electronic components of acceptable price. Given the presence of these positioning assistance means, it will be understood that when it is specified above that a wave, a signal, or a first frequency defines a second frequency or a spectrum distance such as a support distance, that means that the second frequency or distance defined in that way is equal to the defining frequency plus or minus a predetermined value, said defining frequency being the frequency of said wave or said signal or being said first frequency, said predetermined value being equal to one or two times the positioning assistance frequency.

In the two networks given by way of example, the frequency (F(2P−1)A−(F(2P−2)B) which defines the support distance (F(EP−A)−F(EP−2)) is equal to said distance minus twice the positioning assistance frequency (FS). Given the fact that said support distance is substantially equal to the frequency increment (DF), the frequency which defines the support distance is substantially equal to DF−2FS.

Another advantageous disposition concerns the use that may be made of a signalling channel that includes the signalling frequency and all of the frequencies occupied by the various signalling transmitted over the network to set up and control calls, and more generally to control the network.

Such signalling includes the following in particular:

calling signalling emitted by a precalling terminal and containing the address of the precalled terminal;

call acknowledge signalling emitted by the precalled terminal in response to the calling signalling to inform the precalling terminal that the precalled terminal is ready to set up a call; and signalling to allocate a call entitlement, which signalling is used when two terminals seek to establish two different calls simultaneously on the same channel, with the signalling then defining which call has priority.

The advantage of this disposition appears when many calls but not all calls need to transmit messages in limited time, with the messages each including a large quantity of data, which messages may be called "heavyweight". During "heavyweight" calls, the high data rate requires message channels of large bandwidth, whereas during other more "lightweight" calls require less bandwidth. In this disposition, the signalling channel is shared between the various network terminals not only for transmitting said signalling but also for transmitting "lightweight" messages, i.e. messages each including a relatively small amount of data.

More precisely, the terminal under consideration includes:

means for classifying messages to indicate whether a message to be transmitted is a heavyweight message that needs to be transmitted at a relatively high data rate over a relatively long call duration or whether the message is a lightweight message that can be transmitted at a relatively low data rate and/or during a relatively short call duration;

heavyweight message transmission means for transmitting said heavyweight messages in said message channels; and lightweight message transmission means for transmitting said lightweight messages in said signalling channel which then constitutes a channel that is shared between said terminals.

The message classification means are incorporated in the control circuit 40.

The heavyweight message transmission means of the terminal under consideration are the means as described above and they come into action only when the terminal is busy. Its lightweight message transmission means are the same means except that they are put into action by its control circuit while the terminal is in a situation described above as being that of a free terminal. They are put into action when the user peripheral associated with the terminal seeks to emit a message and the message is classified as being lightweight.

This disposition makes it possible, without excessively increasing the bandwidth of the signalling channel, to considerably reduce the number of message channels when the number of heavyweight messages to be transmitted per unit time is significantly smaller than the total number of messages. The spectrum available to the network is thus used more efficiently.

In another advantageous disposition, the bandwidth of the shared channel is substantially equal to said message band-width.

The electronic components used by the shared channel can then be substantially the same as those used by the message channels.

In another advantageous disposition, the shared channel is time multiplexed between said terminals or at least between those of said terminals that are not busy transmitting a heavyweight message, with each of the terminals transmitting lightweight messages and signalling that it needs to transmit over the time-shared channel in the time slots allocated thereto during each multiplexing cycle.

A protocol for gaining access to the shared channel is provided. It may be similar to the protocols that are already known for gaining access to a signalling channel. Call entitlements, including entitlements to establish heavyweight calls are allocated in centralized manner in the control unit BG which dialogs for this purpose with the terminals over the signalling channel. It will nevertheless be understood that such allocation could also be achieved in decentralized manner in which priority calls are defined by dialog between the terminals over the signalling channel.

Figure 2:
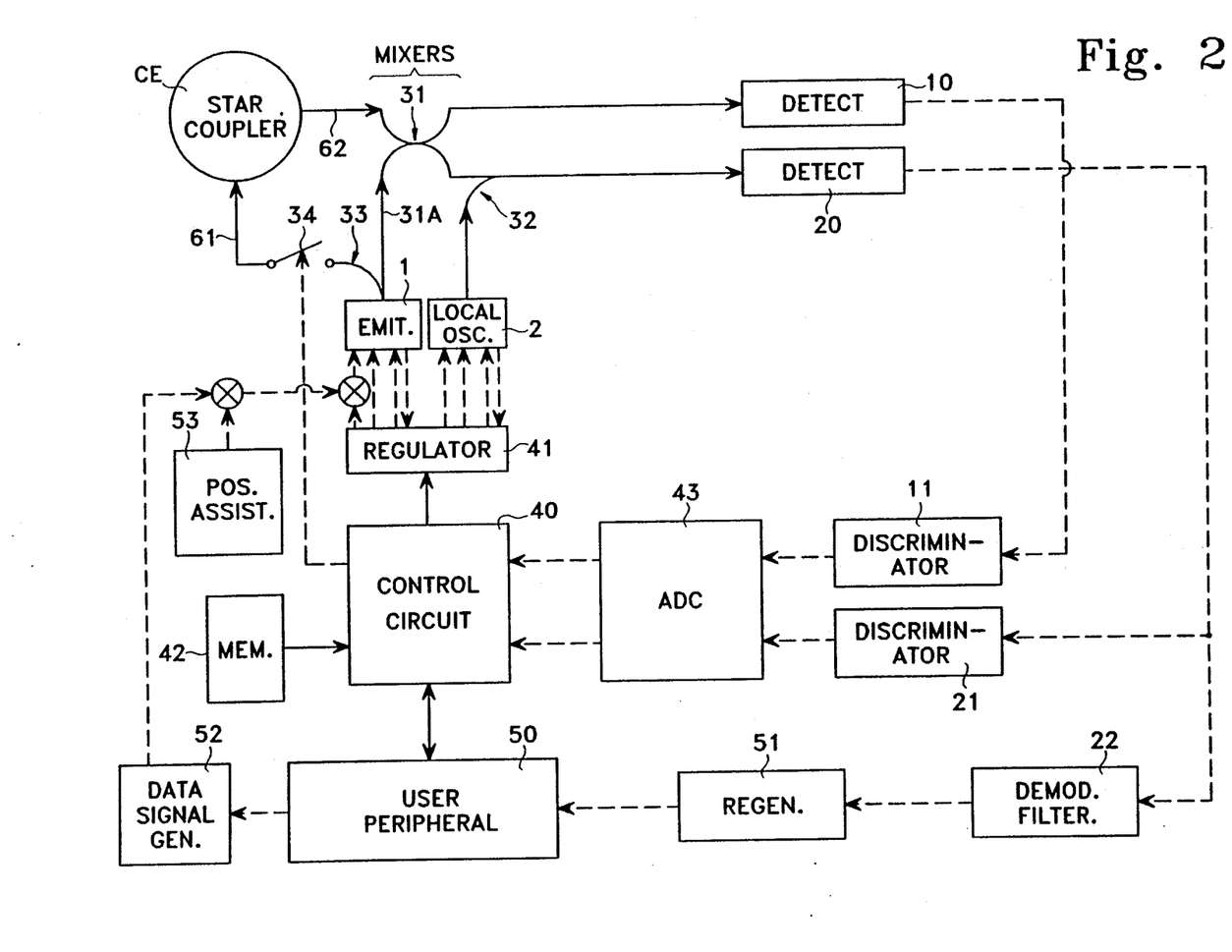
FIG. 2 is a block diagram of a terminal in the first network.

There follows a more concrete description of the terminal under consideration belonging to the first network given by way of example. It may be the terminal T1 as shown in FIG. 1, for example. A star coupler of the network is designated by reference CE.

An emitter 1 and a local oscillator 2 of the terminal under consideration are constituted by means of at least two semiconductor lasers whose frequencies are controlled electrically. An emission frequency control current is provided by said emission positioning means via a regulator circuit 41.

A current controlling the emitted optical intensity includes three components:

a DC bias component delivered by the regulator circuit 41;

an information-carrying modulation component including relatively low frequencies and constituted by a binary digital signal representative of the data that the user peripheral 50 associated with the terminal desires to transmit; this signal is formed in a circuit 52 connected to the user peripheral; and a positioning assistance modulation component which is sinusoidal and at a frequency higher than the frequencies of the information-carrying modulation component, which component constitutes a positioning assistance frequency FS. This third component is applied to the emitter 1 by a positioning assistance generator 53.

An optical switch 34 serves to isolate the emitter from an emission fiber 61 while the terminal is being positioned. An optical coupler 33 takes a portion of the wave delivered by the emitter to mix it in another optical coupler 31 with the waves received over a reception fiber 62. The coupler 31 constitutes said emission positioning mixer. The resulting mixed waves are detected by an emission positioning detector 10 of the quadrature type. The resulting electrical signal constitutes said emission positioning beat signal. Its frequency is measured by an emission position discriminator 11 which is centered on the frequency DF−2FS. The discriminator delivers an emission position error signal for use in servo-controlling the emitter.

A heterodyning detector 20 detects the waves leaving a heterodyning mixer which is constituted by an optical coupler 32 and which receives the waves received over the reception fiber 62 and the wave emitted by the local oscillator 2. A reception position and frequency discriminator 21 centered on an intermediate frequency FI generates a reception position error signal enabling the local oscillator 2 to be servo-controlled. Information-extracting demodulation is performed on the signal detected at 20. It is performed by an amplifier circuit constituting a demodulation filter 22 centered on the intermediate frequency FI and by a regenerator 51 which reconstitutes the digital data in baseband for the user peripheral 50.

Overall control of the terminal is provided by a control circuit 40 which is constituted by a microcircuit and which is connected to the user peripheral 50 associated with the terminal.

The control circuit 40 has inputs which receive the error signals as digitized by an analog-to-digital converter 43. A memory 42 contains, in particular, the operating ranges of the lasers in the emitter 1 and the oscillator 2, i.e. a set of current values describing the tuning range of each of these lasers in steps. The circuit 40 generates reference signals and transmits them to a regulator circuit 41 which regulates the currents and the temperatures of the lasers. It also controls the state of the switch 34 connecting the emitter to the star coupler CE.

For this purpose, it is provided with software constituting the above-mentioned means and providing the following functions in particular:

calculating the tuning currents for the emitter and the local oscillator as a function of the position error signals in such a manner as to maximize the signal delivered by the discriminator 11 and to cancel the error measured by the discriminator 21, with the position of the terminal in the stack or above the stack having no effect on this servo-control;

implementing stack compression, i.e. detecting the disapperance of the call beneath by observing the variations in the power of the emission positioning beat signal and the 2×DF shift instruction which must result therefrom;

taking account of control information from the user peripheral: call requests including the address of the called terminal, alarm signals, and security signals specifying an incorrect transmission that should be interrupted and subsequently restarted;

taking account of signalling coming from the control unit when the terminal is on the shared channel, and in particular authorizations to establish wideband calls, i.e. so-called "heavyweight" calls that need to be established over a message channel; and setting up a call, and in particular if the call is a heavyweight call lowering the frequencies of the lasers from the signalling frequency down to the positions they are to occupy during the call in compliance with the process described above.

The network includes a control unit BG which includes, in particular, the above-described base generator, marking generators, and signalling reference generator. As shown in FIG. 3, the control unit contains five lasers as follows:

a base generator B1 which is stabilized absolutely and which emits a base wave at a base frequency F0 to constitute a reference at the bottom of the spectrum range of the network;

two emitters B2 and B3 which are stabilized in relative manner and which emit the first and second marking waves to constitute two references at the top of the stack; and a signalling emitter B4 and a local oscillator B5 for use in dialoguing with free terminals over the shared channel.

A coupler B50 serves to inject the waves emitted by the sources B1, B2, B3, and B4 into an emission fiber B51 which is connected to the star coupler CE.

The frequency FM1 of the first marking emitter B2 is servo-controlled (see FIG. 4) to a distance DF above the last message channel K(2P). The frequency FM2 of the second marking emitter B3 is servo-controlled at a distance DF above the first marking frequency. The frequency of the signalling emitter B4 is servo-controlled to a distance DF above the second marking frequency. The emitters B2, B3, and B4 are subjected to positioning assistance modulation at the frequency FS so that the servo-control used can be identical to that used for the emitter of the terminal under consideration. For this purpose, a sinewave signal is delivered at the frequency FS by a positioning assistance generator B60.

Optical couplers B12, B13, and B14 are used to take fractions of the waves emitted by the emitters B2, B3, and B4 for the purpose of providing the beats required for servo-control purposes. Couplers B22, B23, B24, and B25 perform the following mixing operations respectively:

mixing the first marking wave from the emitter B2 with the signal from a reception fiber B52 for servo-controlling said emitter;

mixing the second marking wave from the emitter B3 with the first marking wave for servo-controlling said emitter;

mixing the signalling reference wave from the emitter B4 with the second marking wave to servo-control said emitter; and mixing the wave from the local oscillator B5 with the signal from the coupler B22 to servo-control said local oscillator.

Positioning receivers B32, B33, B34, and B35 provide position error signals E2, E3, E4, and E5 for these four servo-control operations. Each of the receivers B32, B33, and B34 is constituted by a quadratic detector and a filter centered on the frequency DF−2FS. The receiver B35 is constituted by a frequency discriminator centered on the intermediate frequency FI.

A control circuit B70 has the following functions:

it performs the servo-control operations, for which purpose it receives the position signals E2, E3, E4, and E5 for the lasers B2, B3, B4, and B5 respectively;

it performs the protocol for gaining access to broadband communications by dialoguing with free terminals over the signalling channel, receiving messages D5 from these terminals via a demodulator B61, and transmitting messages D4 to these terminals by frequency modulating the signalling wave emitted by the emitter B4, thereby taking account of the various requests for broadband access and transmitting authorizations to set up calls; and it increases the frequencies of the lasers B2, B3, B4, and B5 by 2DF after a broadband call has been established so as to mark the new top of the stack taking support from the last emission frequency.

There follows a description of the setting up of a call and then the clearing down of a call.

Two free terminals are put into communication over the signalling channel KZ. The control unit is also present on this channel. It is aware of current call requests, of such priorities as may exist, and of how the spectrum range of the network is occupied. As a function of this information it allocates call entitlements over the message channels marked at the top of the stack and over the shared channel.

During the time taken by the terminals concerned to position themselves on these channels, the waves emitted by these terminals must not be injected into their emission fibers in order to avoid disturbing other calls passing through the star coupler CE. For this purpose, the emitters are temporarily disconnected from the coupler by the switches such as 34.

The calling terminal:

reduces the frequency of its emitter by two 2×DF and it servo-controls it to DF above the highest emission frequency F(2P); and reduces the frequency of its local oscillator by DF and servo-controls it to F1 below the second marking frequency LM2.

The called terminal: reduces the frequency of its emitter by DF and servo-controls it to DF above the first marking frequency LM1; and reduces the frequency of its local oscillator by 2×DF and servo-controls it to FI below the first marking frequency.

The emitters are reconnected to the star coupler and the control unit increases the marking frequencies by 2×DF to servo-control them on the new top of the stack. All of the free terminals are servo-controlled to these frequencies so they follow this movement.

When a call is cleared down, the two terminals engaged in the call disconnect their emitters from the star coupler. In each of these terminals, the frequency of the local oscillator is then temporarily servo-controlled on the emitter. The frequency of the emitter is increased to the top of the stack which it recognizes by detecting the two marking waves. The local oscillators and emitters can then be servo-controlled again on the signalling frequency. The calling terminal of the next call up detects that emission from the terminal beneath it has disappeared and shifts its emission frequency progressively through 2×DF to fill up the gap released by the call that has finished. All of the higher channels in the stack including the signalling channel follow this shift.

FIGS. 4 to 9 show the frequency spectrum of the network when a number P of calls are in progress, with the number 2P being less than the number N of the terminals. These figures show, in particular, a top pair of channels constituted by message channels K(2P−1) and K(2P) used by the top pair of terminals, i.e. the pair of terminals whose emission frequencies F(2P−2) and F(2P) are the furthest from the base frequency F(0).

These two channels are shown with two different types of shading, with a given type of shading being used for all of the waves emitted by a given terminal and for all of the electrical signals that result therefrom. The top pair is the pair conveying the call that has most recently been set up on the network. That is why it is at the top of the stack. More precisely, the calling channel K(2P−1), i.e. the channel used by the calling terminal, constitutes the lower channel of said top pair, with this terminal thus constituting the lower terminal of this pair of terminals. In similar manner, the channel called K(2P) constitutes the upper channel of the same pair.

Figure 4:
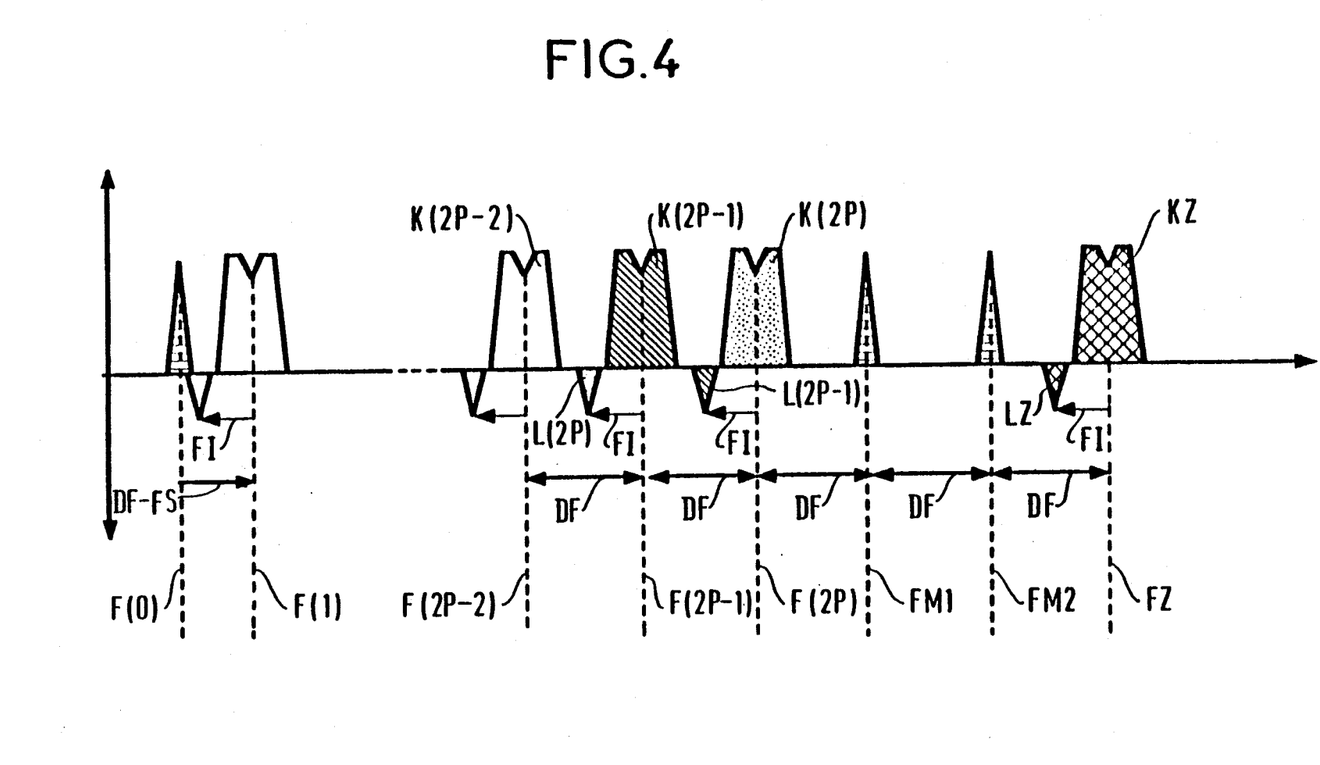
FIG. 4 shows the spectrum of various optical waves present on the first network.

The emission frequencies of these two terminals are written respectively F(2P−1) and F(2P). These frequencies are the mid-frequencies of the corresponding channels.

The local reception waves L(2P−1) and L(2P) which are generated in these two terminals respectively are represented beneath the frequency axis to facilitate understanding the drawing. The message channels occupied by other terminals are shown without shading, and in particular the upper channel K(2P−2) occupied by the upper terminal of the top-but-one pair of terminals.

The emission frequency F(2P−2) which is situated in the middle of the channel K(2P−2) constitutes the lower support frequency for the terminal occupying the channel K(2P−2). The mid-frequency F(2P−1) of this channel constitutes the lower support frequency for the terminal occupying the channel K(2P).

In general, the frequency differences established over the network are represented by heavy horizontal arrows, with the arrow heads designating frequencies that are controlled or predetermined to ensure said differences.

Emission frequency servo-control is generally bilateral servo-control. That is why the servo-control arrows such as the arrow between frequencies F(2P) and F(2P−1) are generally two-headed arrows.

Emission frequency F(1) which is situated at the bottom of the stack is servo-controlled unilaterally relative to the base frequency F(0). The distances between terminals servo-controlled in this way are equal to the frequency increment DF, with the distance between the frequencies F(1) and F(0) being the positioning assistance frequency.

The signalling channel is shown at KZ. The frequencies of the signalling reference wave and of the local reception wave of the signalling generator BG are shown at FZ and LZ, and the first and second marking frequencies are shown at FM1 and FM2, respectively.

The servo-control of the frequencies F(2P), FM1, and FM2 is bilateral. The servo-control of the frequency F2 is unilateral.

Figure 5:
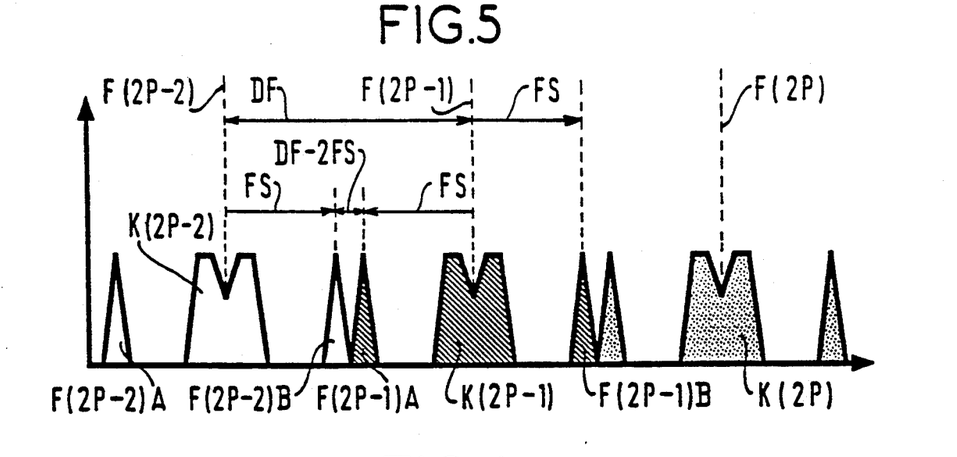
FIG. 5 shows the spectrum of various optical waves present on the reception fiber of a terminal belonging to the first network.

FIG. 5 shows the message channels K(2P−2), K(2P−1), and K(2P), together with their mid-frequencies F(2P−2), F(2P−1), and F(2P). This figure also shows said first and second positioning assistance side frequencies F(2P−1)A and F(2P−1)B of the terminal under consideration which occupies the channel K(2P−1). These frequencies are respectively equal to F(2P−1)−FS and F(2P−1)+FS.

For the channel K(2P−2) the corresponding waves are shown at (F(2P−2)A) and (F(2P−2)B), respectively.

The lower support distance F(2P−1)−F(2P−2) of the terminal occupying the channel K(2P−1) is maintained equal to the frequency increment DF because the difference between the frequencies F(2P−1)A and (F(2P−2)B) is maintained equal to said emission positioning reference frequency which is equal to DF−2FS.

Figure 6:
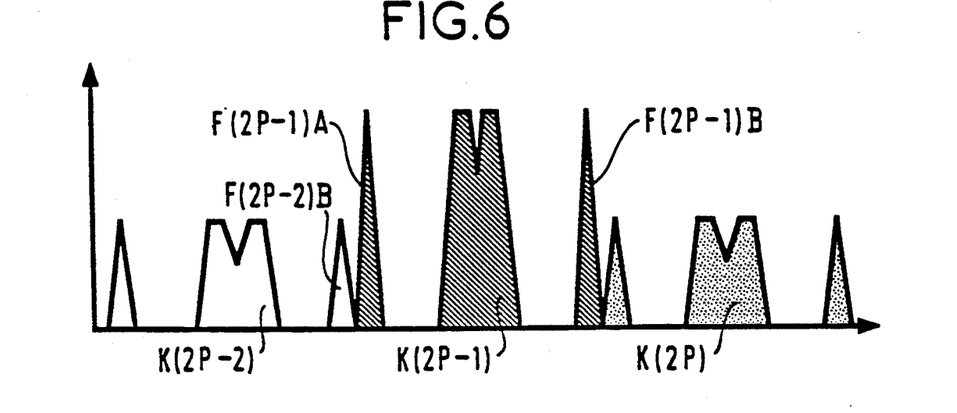
FIG. 6 shows the spectrum of the optical waves of FIG. 5 after said waves have been mixed with the optical waves emitted by the emitter in the same terminal.

FIG. 6 shows the spectrum of the same optical waves at the inlet to the detector 10 of the terminal under consideration. It differs from FIG. 5 by the waves from the emitter 1 being of increased relative intensity, i.e. the waves occupying the channel K(2P−1) and the side frequencies (F(2P−1)A) and (F(2P−1)B).

Figure 7:
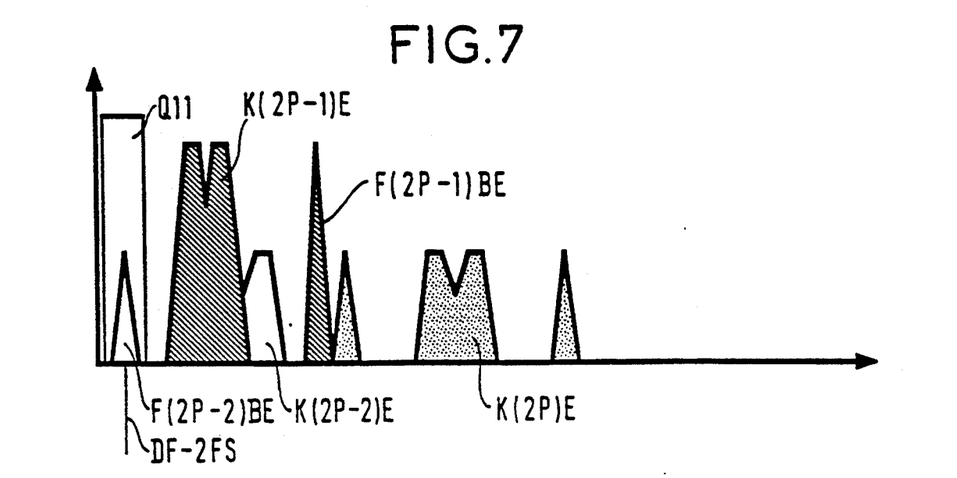
FIG. 7 shows the spectrum of electrical signals that results from detecting the optical waves of FIG. 6 to enable the spectrum position of the emitter in the terminal of FIG. 2 to be servo-controlled.

FIG. 7 is a diagram showing a theoretical spectrum of the electrical signals that result from detecting said waves in the detector 10. The passband of the discriminator 11 is centered on the positioning reference frequency DF−2FS and is shown at Q11. The signals resulting from detecting some of the waves are designated by the references for said waves plus the letter E. Their frequencies are equal to the difference between the frequencies of said waves and the first positioning assistance side frequency (F(2P−1)A) of said terminal which is one of the higher power frequencies. It will be understood that some signals have been omitted such as those that result from beats of various waves with the channel K(2P−1) or with the frequency (F(2P−1)B) which also correspond to high powers. It will also be understood that some signals such as K(2P)E are shown to facilitate understanding but that they are at frequencies which are too high to appear in fact in electrical form at the outlet from the detector.

Figure 8:
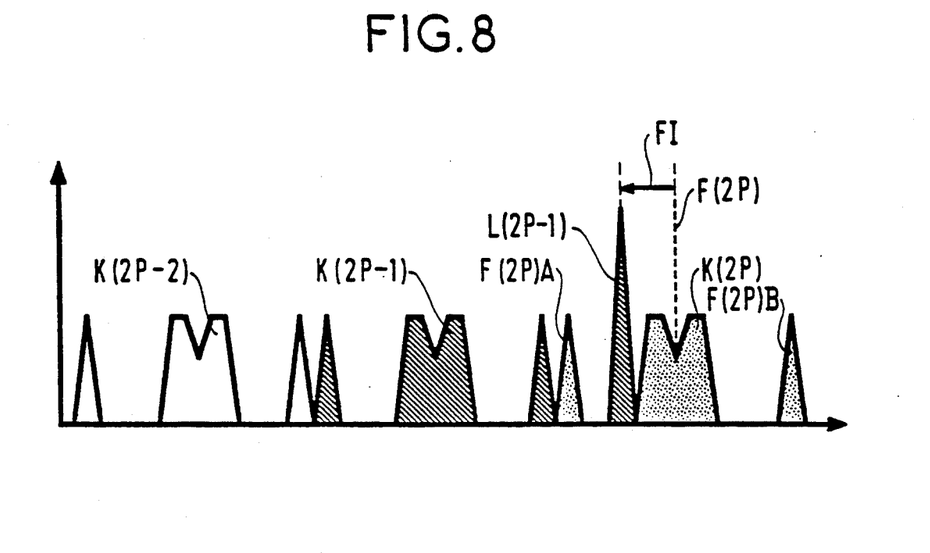
FIG. 8 shows the spectrum of the optical waves of FIG. 5 after these waves have been mixed with the optical wave emitted by the local oscillator in the terminal of FIG. 2.

FIG. 8 represents the optical spectrum at the inlet of the terminal 20 in the terminal under consideration. In this spectrum the highest power wave is the local reception wave coming from the local oscillator 2 and its frequeny is designated by reference L(2P−1) and is equal to F(2P)−FI because of the servo-control performed by means of the detector 20.

Figure 9:
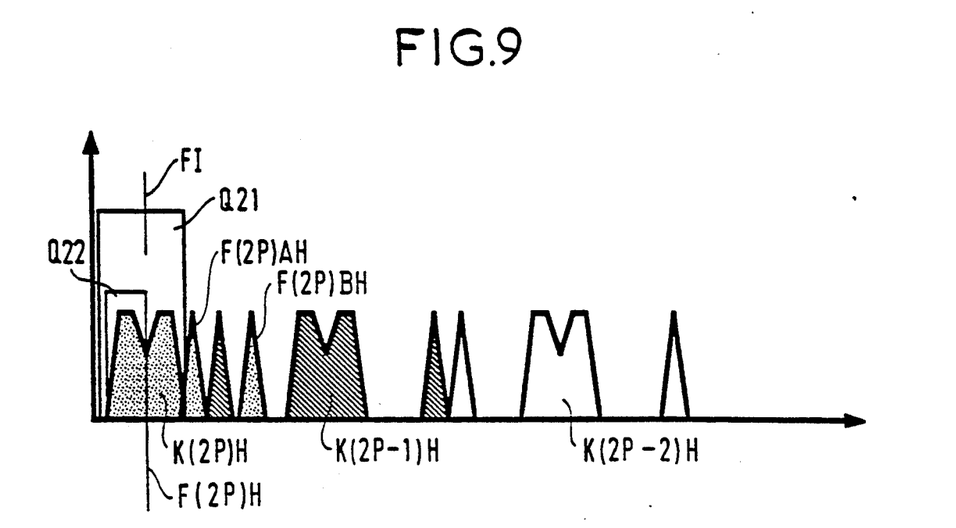
FIG. 9 shows the spectrum of the electrical signals that result from detecting the optical signals of FIG. 8 to enable the frequency of the local oscillator of the terminal of FIG. 2 to be servo-controlled.

FIG. 9 shows the electrical signals resulting from some of these waves being detected by the detector 20, with the electrical signals being designated by the same references as said waves plus the letter H. Their frequencies are equal to the difference between the frequencies of said waves and the high power frequency L(2P−1). The same remarks apply as applied to FIG. 7.

The passbands of the discriminator 21 and of the amplifier and filter circuit 22 are shown as Q21 and Q22 respectively.

Figure 10:
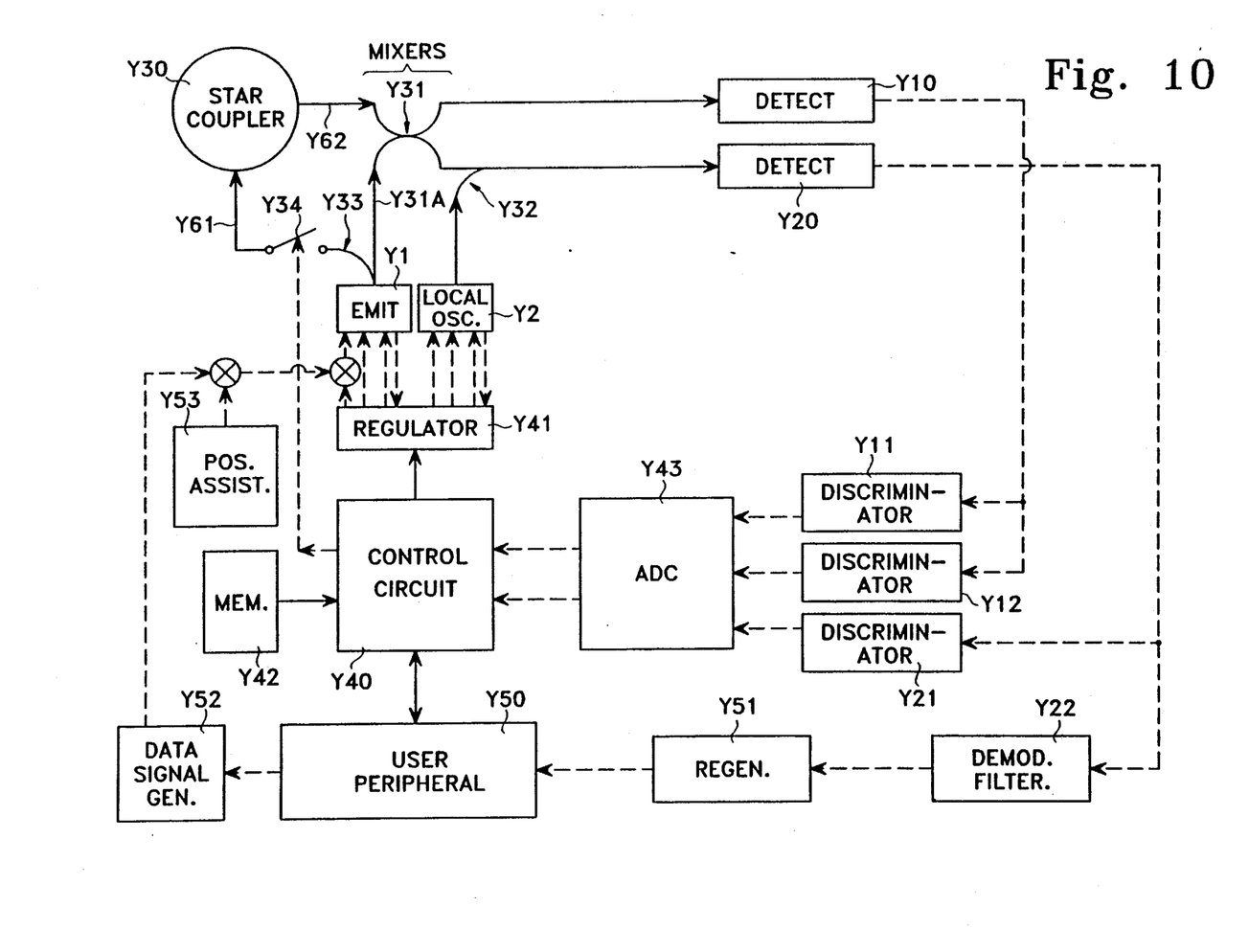
FIG. 10 is a block diagram of a terminal in a second network given as an example of an implementation of the present invention.

The second network constituting an embodiment of the present invention is now described. This network is shown in FIG. 10. It is generally similar to the above-described first network except that it operates in alternating mode and compared with the first network it has dispositions that differ at least in part and that are adapted to this mode of operation, with some of them now being described.

Firstly, and in general, it is advantageous for said support discrimination means of the terminal under consideration in a network operating in alternating mode to include means for forming the support discrimination wave that are put into action by said loss-of-support signal to provide a support discrimination wave to said local input (Y31A) of said emission positioning mixer (Y31) of the terminal, which support discrimination wave has a support discrimination frequency at a support discrimination spectrum difference from a value of said local emission positioning frequency immediately prior to said loss-of-support signal being formed that is suitable to cause a positioning difference to appear affecting the frequency of said emission positioning beat signal, said positioning difference being capable of having one or other of two algebraic signs, positive and negative; said loss-of-lower-support signals being provided when said positioning difference has a predetermined algebraic sign.

In another advantageous disposition, the support discrimination wave forming means are means for giving rise to an emission difference that temporarily affects the emission frequency of the terminal under consideration. This emission difference may be positive, for example i.e. the emission frequency may be moving temporarily a little further from the base frequency. When the positioning assistance frequency FS is less than half the frequency increment DF, the loss-of-lower-support signal will be provided and the emission frequency will be shifted progressively towards the base frequency if the emission positioning beat signal is subjected to a negative frequency difference. This may be detected, for example, by a control circuit Y40 at the output of a support discriminator Y12 constituted by a frequency discriminator provided for this purpose and fed from the output of the emission positioning detector Y10.

As shown in FIG. 10, the terminal under consideration of the network operating in alternating mode includes items analogous to those of the terminals shown in FIG. 2 except that the support discriminator Y12 is added and the control circuit Y40 is partially modified. When two items in these two terminals are analogous, the reference symbols designating these two items are the same except that the letter "Y" is added to the beginning of the reference symbols used for items in the terminal shown in FIG. 10.

We claim:

1. A method of transmitting data between external user peripherals by means of a transmission network including terminals and at least some common transmission lines which are common to all of the terminals, said data being separate from signalling transmitted between the terminals, said terminals being connected firstly to one another by means of said common transmission lines and secondly to respective external user peripherals whereby said terminals constitute ports via which said external user peripherals access said network, said method comprising the steps of:

forming individual messages from said data, each message to be transmitted between two respective user peripherals, classifying said individual messages into heavyweight messages and lightweight messages, a heavyweight message requiring transmission at a higher data rate and for a longer call duration than a lightweight message, providing a plurality of frequency channels over said common transmission lines, designating some of said plurality of frequency channels as respective message channels and designating another of said frequency channels as a shared channel, tuning the two respective terminals between which each individual heavyweight message is to be transmitted to a same respective message channel throughout the duration of transmission of the heavyweight message, transmitting the heavyweight messages in the respective message channels, tuning the terminals to the shared channel when they are not tuned to a message channel, and transmitting the lightweight messages in said shared channel.

2. A method according to claim 1, further comprising the step:

using said shared channel as a signalling channel for transmitting signalling internal to said network.

3. A message transmission network, the network comprising:

a plurality of terminals;

a plurality of user peripherals which are external to the network and between which data are to be transmitted, said data being separate from signalling transmitted between the terminals, each of said external user peripherals being associated with one of said terminals;

two transmission lines associated with each of the terminals for transmitting waves, said transmission lines comprising an emission line for guiding emission waves emitted at an emission frequency by the terminal, and a reception line for guiding the waves received by the terminal; and a star coupler for receiving waves reaching it via the emission lines and for transmitting each of said waves to all of the terminals via the reception lines; comprising:

message means for forming individual messages from said data originating from an associated external user peripheral, each said individual message being designated for transmission from the associated external user peripheral to another of said external user peripherals, channel means for tuning the respective terminal to a plurality of frequency channels including firstly a plurality of message channels each suitable for being temporarily attributed to a respective said message for transmitting that message by tuning only those terminals between which the message is to be transmitted to its respective channel, and secondly a shared channel to which the terminal under consideration is tuned when it is not tuned to a message channel, classification means for classifying said individual messages into heavyweight messages and at least some lightweight messages, a heavyweight message requiring transmission at a higher data rate and for a longer call duration than a lightweight message, and tuning means for tuning said terminal to a message channel only during transmission of a heavyweight message.

4. A network according to claim 3, wherein each said terminal further comprises signalling means for transmitting over said shared channel not only said lightweight messages to be transmitted between said user peripherals external to said network, but also signalling internal to said network.

* * * * *